United States Patent
Zhou et al.

(10) Patent No.: US 11,410,458 B2
(45) Date of Patent: Aug. 9, 2022

(54) FACE IDENTIFICATION METHOD AND APPARATUS, MOBILE TERMINAL AND STORAGE MEDIUM

(71) Applicant: GUANGDONG OPPO MOBILE TELECOMMUNICATIONS CORP., LTD., Guangdong (CN)

(72) Inventors: Haitao Zhou, Dongguan (CN); Fangfang Hui, Dongguan (CN); Ziqing Guo, Dongguan (CN); Xiao Tan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 320 days.

(21) Appl. No.: 16/483,805

(22) PCT Filed: Feb. 18, 2019

(86) PCT No.: PCT/CN2019/075384
§ 371 (c)(1),
(2) Date: Aug. 6, 2019

(87) PCT Pub. No.: WO2019/196559
PCT Pub. Date: Oct. 17, 2019

(65) Prior Publication Data
US 2020/0380244 A1   Dec. 3, 2020

(30) Foreign Application Priority Data

Apr. 12, 2018   (CN) .......................... 201810326645.2
Apr. 12, 2018   (CN) .......................... 201810327410.5

(51) Int. Cl.
*G06K 9/00*   (2022.01)
*G06V 40/16*   (2022.01)
(Continued)

(52) U.S. Cl.
CPC .......... *G06V 40/166* (2022.01); *G06V 10/143* (2022.01); *G06V 10/145* (2022.01); *G06V 40/45* (2022.01)

(58) Field of Classification Search
None
See application file for complete search history.

(56) References Cited

U.S. PATENT DOCUMENTS

| 6,907,134 B1 | 6/2005 | Yamada |
| 7,092,555 B2 | 8/2006 | Lee |

(Continued)

FOREIGN PATENT DOCUMENTS

| CN | 101159016 A | 4/2008 |
| CN | 102271291 A | 12/2011 |

(Continued)

OTHER PUBLICATIONS

International Search Report in the international application No. PCT/CN2019/075384, dated Apr. 18, 2019.
The Written Opinion of the International Search Authority in the international application No. PCT/CN2019/075384, dated Apr. 18, 2019.

(Continued)

*Primary Examiner* — Leon Viet Q Nguyen

(57) ABSTRACT

A method and device for face identification, and a mobile terminal and a storage medium are provided. The method includes: (101) an image sensor is controlled to perform imaging; (102) imaging data obtained by the image sensor through the imaging is acquired; and (103) liveness detection is performed on an imaging object based on the imaging data.

6 Claims, 6 Drawing Sheets

(51) Int. Cl.
  *G06V 10/143* (2022.01)
  *G06V 10/145* (2022.01)
  *G06V 40/40* (2022.01)

(56) References Cited

U.S. PATENT DOCUMENTS

| | | | |
|---|---|---|---|
| 9,202,105 | B1 | 12/2015 | Wang et al. |
| 9,251,427 | B1 | 2/2016 | Chu et al. |
| 10,204,262 | B2 * | 2/2019 | Price .................. H04N 13/271 |
| 2016/0071111 | A1 | 3/2016 | Wang et al. |
| 2016/0140390 | A1 * | 5/2016 | Ghosh .............. G06K 9/00617 |
| | | | 348/78 |
| 2016/1404061 | | 5/2016 | Chu et al. |
| 2017/0169284 | A1 | 6/2017 | Chu et al. |
| 2017/0345146 | A1 * | 11/2017 | Fan .................. G06K 9/00228 |
| 2018/0218371 | A1 | 8/2018 | Wang et al. |
| 2018/0307895 | A1 | 10/2018 | Chu et al. |
| 2019/0050866 | A1 | 2/2019 | Wang et al. |
| 2019/0130171 | A1 * | 5/2019 | Alameh .............. G01J 5/0025 |
| 2021/0049391 | A1 * | 2/2021 | Zou .................. G06K 9/00906 |

FOREIGN PATENT DOCUMENTS

| | | |
|---|---|---|
| CN | 102622588 A | 8/2012 |
| CN | 202815718 U | 3/2013 |
| CN | 105138967 A | 12/2015 |
| CN | 105354557 A | 2/2016 |
| CN | 105718925 A | 6/2016 |
| CN | 105827953 A | 8/2016 |
| CN | 105912908 A | 8/2016 |
| CN | 106372601 A | 2/2017 |
| CN | 106407914 A | 2/2017 |
| CN | 107133608 A | 9/2017 |
| CN | 107277053 A | 10/2017 |
| CN | 107368769 A | 11/2017 |
| CN | 107832677 A | 3/2018 |
| CN | 104966070 B | 4/2018 |
| CN | 108596061 A | 9/2018 |
| CN | 108616688 A | 10/2018 |
| DE | 102016009619 A1 | 2/2018 |
| JP | 2005327043 A | 11/2005 |
| TW | 201727537 A | 8/2017 |

OTHER PUBLICATIONS

Sun Lin et al: "TIR/VIS Correlation for Liveness Detection in Face Recognition", Aug. 29, 2011 (Aug. 29, 2011), International Conference on Financial Cryptography and Data Security; [Lecture Notes in Computer Science; Lect.Notes Computer], Springer, Berlin, Heidelberg, pp. 114-121, XP047368916, ISBN: 978-3-642-17318-9 * the whole document *.

Ivana Chingovska et al: "Face Recognition Systems Under Spoofing Attacks" In: "Face Recognition Across the Imaging Spectrum", Jan. 1, 2016 (Jan. 1, 2016), Springer International Publishing, Cham, XP055377545, ISBN: 978-3-319-28501-6 pp. 165-194, DOI: 10.1007/978-3-319-28501-6_8, * the whole document *.

Supplementary European Search Report in the European application No. 19749165.7, dated Feb. 18, 2020.

First Office Action of the Europe application No. 19749165.7, dated Mar. 2, 2021.

Chen X et al: "IR and visible light face recognition", Computer Vision and Image Understanding, Academic Press, US, vol. 99, No. 3, Sep. 1, 2005 (Sep. 1, 2005), pp. 332-358, XP027222016, ISSN: 1077-3142 [retrieved on Aug. 13, 2005].

First Office Action of the India application No. 201917049301, dated Apr. 28, 2021.

First Office Action of the Taiwan application No. 108112844, dated Jan. 13, 2020.

First Office Action of the China application No. 201810326645.2, dated Jun. 13, 2019.

Decision of Refusal of the Chinese application No. 201810326645.2, dated Nov. 11, 2019.

First Chinese Office Action dated Jun. 13, 2019; Appln. No. 201810326645.2.

Decision of Refusal of the Taiwanese application No. 108112844, dated May 20, 2020.

Office Action of the Chinese application No. 201810327410.5, dated Feb. 22, 2019.

Second Office Action of the Chinese application No. 201810327410.5, dated May 7, 2019.

Decision of Refusal of the Chinese application No. 201810327410.5, dated Jul. 15, 2019.

Second Office Action of the Chinese application No. 201810326645.2, dated Aug. 16, 2019.

* cited by examiner

FACE IDENTIFICATION METHOD AND APPARATUS, MOBILE TERMINAL AND STORAGE MEDIUM

CROSS-REFERENCE TO RELATED APPLICATIONS

The application claims priority and benefit of Chinese Patent Applications No. 201810327410.5 and 201810326645.2 filed on Apr. 12, 2018, the contents of which are hereby incorporated by reference in their entireties.

TECHNICAL FIELD

The disclosure relates to the field of mobile terminal technologies, and in particular to a method and device for face identification, a mobile terminal and a storage medium.

BACKGROUND

With the development of science and technology, an identity identification technology based on a biological characteristic is becoming increasingly mature and has a great superiority in a practical application. At present, identity verification can be performed based on face identification, and after the verification succeeds, terminal unlocking, e-payment and the like are carried out.

SUMMARY

The disclosure discloses a method and device for face identification, a mobile terminal and a computer readable storage medium.

An embodiment of the disclosure discloses a method for face identification, which may include: an image sensor is controlled to perform imaging; imaging data obtained by the image sensor through the imaging is acquired; and liveness detection is performed on an imaging object based on the imaging data.

An embodiment of the disclosure discloses a device for face identification, which may include a control module, an acquisition module and a detection module. The control module is configured to control an image sensor to perform imaging. The acquisition module is configured to acquire imaging data obtained by the image sensor through the imaging. The detection module is configured to perform liveness detection on an imaging object based on the imaging data.

An embodiment of the disclosure discloses a mobile terminal, which may include an imaging sensor, a memory, a Microcontroller Unit (MCU), a processor, and a trusted application stored on the memory and capable of being run under a trusted execution environment of the processor. The MCU is special hardware of the trusted execution environment, and is connected with the imaging sensor and the processor. The MCU is configured to control the imaging sensor to perform imaging and send imaging data to the processor. The processor executes the trusted application to implement the method for face identification in the above embodiment.

An embodiment of the disclosure discloses a computer readable storage medium having stored thereon a computer program that, when executed by a processor, causes the processor to perform the method for face identification in the above embodiment.

Some additional aspects and advantages of the disclosure will be provided in the following description, and some will become apparent in the following description or will be understood by the practice of the disclosure.

BRIEF DESCRIPTION OF DRAWINGS

The above and/or additional aspects and advantages of the disclosure will become apparent and will be easily understood in the following description of the embodiments made in combination with the accompanying drawings.

DETAILED DESCRIPTION

The embodiments of the disclosure will be described below in detail. Examples of the embodiments are shown in the accompanying drawings, and same or similar numerals indicate same or similar components or components having same or similar functions all the time. The embodiments described below with reference to the accompanying drawings are exemplary, are intended to explain the disclosure and cannot be understood as limits to the disclosure.

Hereinafter, a method and device for face identification in the embodiments will be described with reference to the accompanying drawings.

At present, the identity verification may be performed based on face identification, and after the verification is passed, terminal unlocking, e-payment and the like are carried out. Such a manner is more convenient and securer compared with the traditional password verification. However, the traditional single face identification and the like only can guarantee that characteristics of a person can be effectively verified; and as a result, the terminal unlocking, e-payment and the like may also be performed by using a photo. Hence, the existing identity verification based on the face identification technology is low in security and reliability.

For the above problem, an embodiment of the disclosure discloses a method for face identification. According to the method, before the identity verification is performed by using a structured light depth model, liveness detection is performed at first, and after the liveness detection succeeds, the verification on a depth model of a face is performed, thereby preventing the identity verification from utilizing an artificial article such as a photo and improving the security and reliability of the identity verification.

Figure 1:
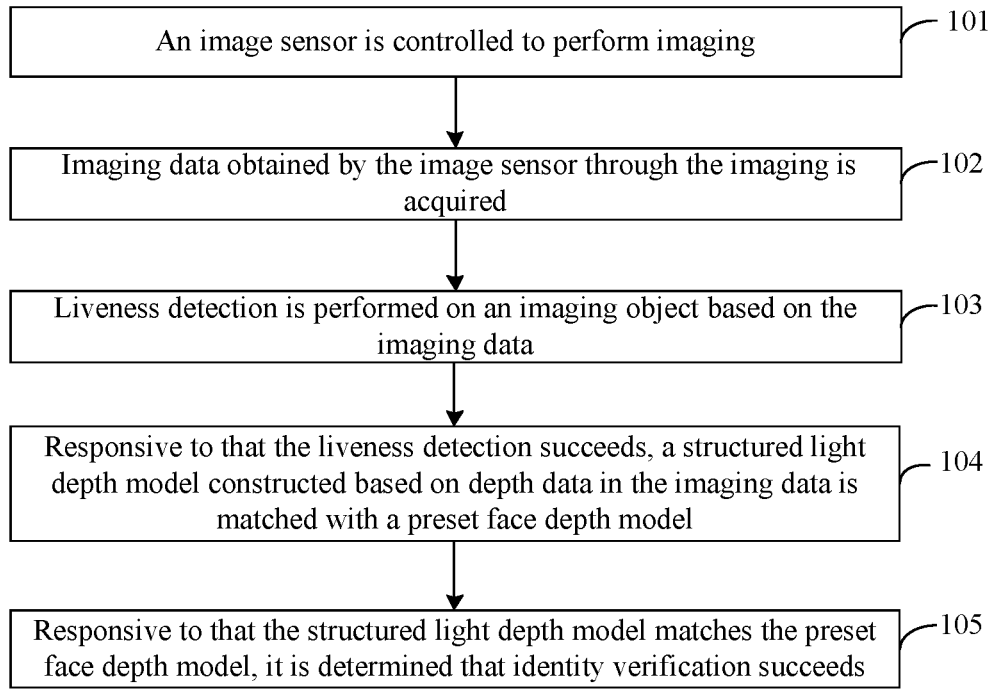
FIG. 1 is a flowchart diagram of a method for face identification according to an embodiment of the disclosure.

FIG. 1 is a flowchart diagram of a method for face identification according to an embodiment of the disclosure.

Figure 2:
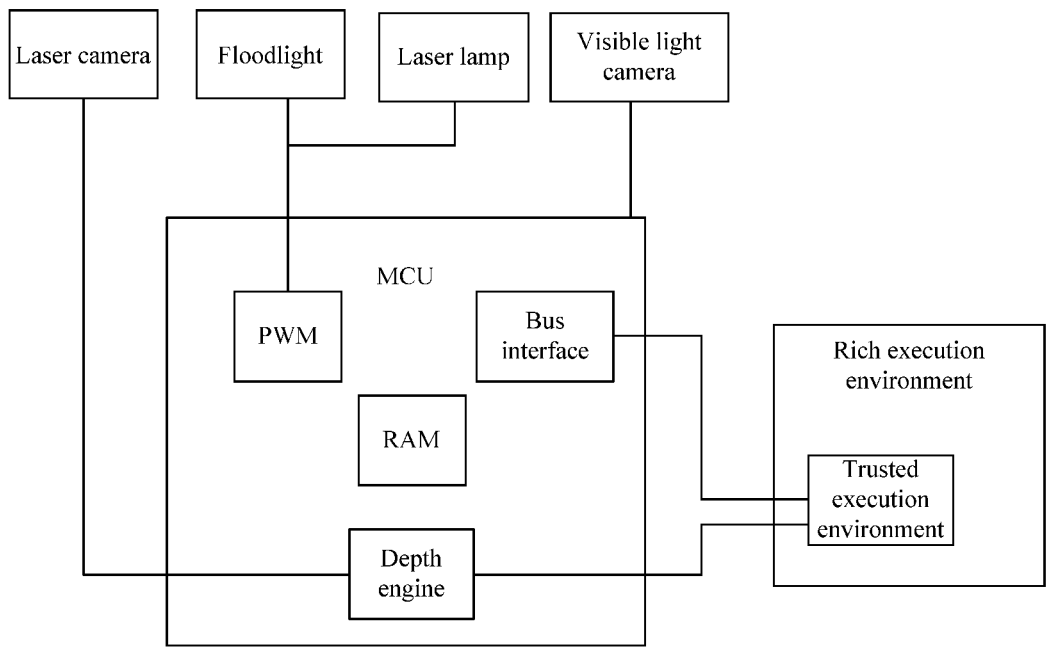
FIG. 2 is a structural diagram of an electronic device according to an embodiment of the disclosure.

The method for face identification may be applied to an electronic device. As a possible implementation manner, a structure of the electronic device may refer to FIG. 2. FIG. 2 is a structural diagram of an electronic device according to an embodiment of the disclosure.

It is to be noted that a person skilled in the art may know that the method in FIG. 1 is not limited to the electronic device illustrated in FIG. 2, the electronic device illustrated in FIG. 2 is merely taken as a schematic description, and the method in FIG. 1 may be used in an electronic device having a rich execution environment and may further be used in other electronic devices having a trusted execution environment and special hardware of the trusted execution environment, which is not limited by this embodiment thereto.

As illustrated in FIG. 2, the electronic device includes: a laser camera, a floodlight, a visible light camera, a laser lamp and a Microcontroller Unit (abbreviated as MCU). The MCU includes a Pulse Width Modulation (abbreviated as PWM), a depth engine, a bus interface and a Random Access Memory (RAM). In addition, the electronic device further includes a processor; the processor is provided with a trusted execution environment. The MCU is special hardware of the trusted execution environment in which a trusted application for executing the method illustrated in FIG. 1 is run. The processor may further be provided with a rich execution environment, and the rich execution environment and the trusted execution environment are isolated from each other.

The PWM is configured to modulate the floodlight to emit infrared light and modulate the laser lamp to emit structured light. The laser camera is configured to acquire a structured light image or a visible light image of an imaging object. The depth engine is configured to calculate, based on the structured light image, to acquire depth data corresponding to the imaging object. The bus interface is configured to send the depth data to the processor to enable the trusted application run on the processor to execute a corresponding operation with the depth data. The bus interface includes: a Mobile Industry Processor Interface (abbreviated as MIPI), an 12C synchronous serial bus interface, and a Serial Peripheral Interface (abbreviated as SPI).

As illustrated in FIG. 1, the method for face identification may include the following operations.

At block 101, an image sensor is controlled to perform imaging, where the image sensor includes a structured light sensor.

In this embodiment, the method for face identification may be executed by a trusted application, where the trusted application is run in a trusted execution environment. The trusted application may be understood as an application involving the security of information such as a user resource and user privacy, and such type of application like an e-payment program and an unlocking program requires a high security level.

The trusted execution environment is a security area on a main processor of an electronic device (such as an intelligent mobile phone and a tablet computer) and may ensure the security, confidentiality and integrity of codes and data loaded to the trusted execution environment. The trusted execution environment provides an isolated execution environment and the provided security characteristics include: isolated execution, integrity of the trusted application, confidentiality of the trusted data, security storage, etc. To sum up, the execution space provided by the trusted execution environment provides a higher level of security than a common mobile operation system such as ISO and Android.

In this embodiment, the trusted application is run in the trusted execution environment, and thus the security of identity verification is improved from an operation environment.

When the trusted application is run, such as the e-payment and electronic device unlocking are performed, the image sensor may be controlled by the special hardware of the trusted execution environment to start for imaging. The special hardware may be an MCU, and the image sensor may include the structured light sensor.

In this embodiment, the structured light sensor may include a laser camera and a laser lamp. The MCU may modulate the laser lamp on the electronic device to emit structured light, and the structured light is projected to an imaging object. The structured light is hindered by the imaging object and is reflected by the imaging object. The laser camera captures the structured light reflected by the imaging object to perform imaging.

In this embodiment, since characteristics of body sites of each person are different generally, a body site may be selected as the imaging object. For example, the imaging object may be the body site such as a face, a facial organ (eye, nose and mouth) or a hand.

At block 102, imaging data obtained by the image sensor through the imaging is acquired.

In this embodiment, the imaging data obtained by the image sensor through the imaging, such as depth data obtained by the structured light sensor through imaging, may be acquired by special hardware.

At block 103, liveness detection is performed on an imaging object based on the imaging data.

In this embodiment, the liveness detection may be performed on the imaging object by using depth data in the imaging data. Specifically, a structured light depth model is constructed based on the depth data, and a target organ is identified from the structured light depth model. Particularly, the structured light depth model is compared with a pre-stored structured light depth model of a facial organ to identify a target organ from the structured light depth model.

When the imaging object is a living body, it is impossible for the imaging object to keep stationary all the time. When an organ is in a moving state, the depth data of the organ will also change. Therefore, whether the target organ is in the moving state is determined by tracking the target organ in this embodiment.

After the target organ is identified, a depth image of the imaging object is acquired continuously to acquire continuous multiple frames of depth images. By comparing depth data of a same organ in the continuous multiple frames of depth images, whether the organ is in the moving state is determined. When the depth data of the same organ in the continuous multiple frames of depth images change, it may be determined that the organ is in the moving state.

When the target organ is in the moving state, it is indicated that the imaging object is not the artificial article such as the photo and thus it may be determined that the imaging object is the living body. When the target organ is in the stationary state, it may be determined that the imaging object is not the living body and may be the artificial article such as the photo.

In this embodiment, by identifying the target organ from the structured light depth model and tracking the target organ, whether the target organ is in the moving state is determined and then whether the imaging object is the living body is determined, so the accuracy of the liveness detection is high.

At block 104, responsive to that the liveness detection succeeds, the structured light depth model constructed based on depth data in the imaging data is matched with a preset face depth model.

When the imaging object passes through the liveness detection, the structured light depth model of the imaging object is matched with the preset face depth model.

As a possible implementation manner, the structured light depth model constructed may be compared with the preset face depth model; and when the similarity is greater than a preset threshold, it may be considered that the structured light depth model matches the preset face depth model.

It may be understood that the preset face depth model is pre-stored and is constructed by using depth data in a structured light image that is obtained by the structured light sensor through performing imaging on a face of an owner of an electronic device. The preset face depth model is used for the identity verification.

At block 105, responsive to that the structured light depth model matches the preset face depth model, it is determined that identity verification succeeds.

Responsive to that the structured light depth model of the imaging object matches the preset face depth model, it is determined that the identity verification is passed and subsequent operations, such as e-payment and electronic device unlocking, may be performed.

Responsive to that the liveness detection fails, a message that the liveness detection fails may be returned; or responsive to that the structured light depth model of the imaging object does not match the preset face depth model, a message that the identity verification fails is returned.

In this embodiment, the liveness detection is performed on the imaging object based on the imaging data at first, and after the liveness detection succeeds, the identity verification is performed based on the structured light depth model, so that a situation in which the identity verification is passed by using the artificial article such as the photo may be prevented, and the security and reliability for the identity verification with the face are improved.

Further, in the foregoing identity verification and liveness detection processes, the imaging data required for the identity verification and liveness detection is acquired by special hardware under a trusted environment, thus guaranteeing the security of data sources for the identity verification and liveness detection and further improving the security and reliability.

In the above embodiment, the image sensor, that is controlled by the special hardware, for imaging may further include an infrared sensor, where the infrared sensor may include a laser camera and a floodlight. When the infrared sensor is controlled to perform imaging, a PWM may modulate the floodlight on the electronic device to emit infrared light to project to the imaging object. The infrared light is hindered by the imaging object and is reflected by the imaging object. And the laser camera captures the infrared light reflected by the imaging object to perform imaging.

Figure 3:
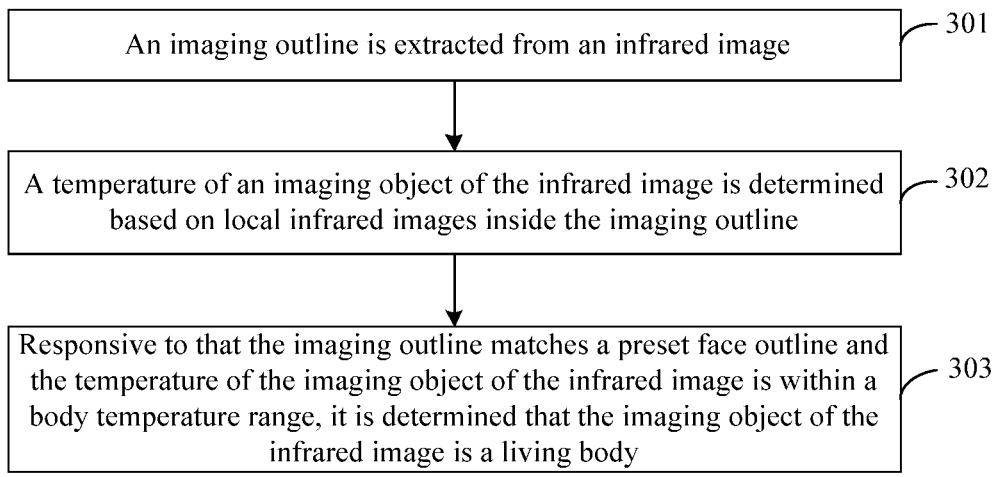
FIG. 3 is a flowchart diagram of a method for performing liveness detection based on an infrared image according to an embodiment of the disclosure.

In the liveness detection, whether the imaging object of the infrared image is the living body may be identified by virtue of an infrared image obtained by the infrared sensor through the imaging. FIG. 3 is a flowchart diagram of a method for performing liveness detection based on an infrared image according to an embodiment of the disclosure.

As illustrated in FIG. 3, the liveness detection method may include the following operations.

At block 301, an imaging outline is extracted from an infrared image.

In this embodiment, the imaging outline may be extracted based on edge pixel points in the infrared image.

At block 302, a temperature of an imaging object of the infrared image is determined based on local infrared images inside the imaging outline.

In this embodiment, the imaging outline may be divided into a plurality of portions to determine a temperature corresponding to each local infrared image. An average value is solved by adding the temperature corresponding to each local infrared image together and is taken as the temperature of the imaging object of the infrared image.

As a possible implementation manner, the infrared image is obtained by the infrared sensor through acquiring infrared light emitted by a human body for imaging; and the value of each pixel point in the infrared image corresponds to the temperature of the human body and accordingly the temperature of the imaging object is determined.

As another possible implementation manner, the infrared image is obtained by the infrared sensor through actively projecting the infrared light to the human body and receiving the infrared light reflected by the human body for imaging. A response frequency of the infrared sensor should simultaneously cover a frequency of the infrared light projected actively and a frequency of the infrared light emitted by the human body. As a result, in the infrared image, the value of each pixel point is an overlapped effect for the infrared light reflected by the human body and the infrared light emitted by the human body. Since the intensity of the projected infrared light is known, after an infrared radiation temperature corresponding to each pixel point is determined based on a correspondence between the value of the pixel point in the infrared image and the infrared radiation temperature, a corresponding infrared radiation corrected temperature is determined based on the intensity of the projected infrared light. The infrared radiation corrected temperature is adopted to correct the infrared radiation temperature corresponding to the pixel point and the temperature of the imaging object is determined based on the corrected infrared radiation temperature.

At block 303, responsive to that the imaging outline matches a preset face outline and the temperature of the imaging object of the infrared image is within a body temperature range, it is determined that the imaging object of the infrared image is a living body.

In this embodiment, the imaging outline is matched with the preset face outline. As an example, the imaging outline may be matched in stages; and when the level of similarity in each stage is greater than a preset threshold of the stage, it may be considered that the imaging outline matches the preset face outline, i.e., the imaging object is the pre-stored imaging object.

When the imaging outline is compared with the preset face outline, the face outline may be divided into an upper half portion and a lower half portion with eyebrows as a dividing line, and the comparison is made in stages. Since the upper half portion (including the eyebrows) is affected by eyebrow shapes and a hairstyle, the change of the upper half portion is relative large and the confidence level is low. The lower half portion, such as eyes, eyebrows, nose and mouth, is fixed, so a preset threshold of the similarity corresponding to the upper half portion is less than a preset threshold of the similarity corresponding to the lower half portion.

By respectively comparing the upper half portion and the lower half portion, when the similarity between an upper half portion of the imaging outline and the upper half portion of the pre-stored face outline is greater than a corresponding preset threshold and the similarity between a lower half portion of the imaging outline and the lower half portion of the pre-stored face outline is greater than a corresponding preset threshold, it may be considered that the imaging outline matches the pre-stored face outline.

Responsive to that the imaging outline matches the preset face outline and the temperature of the imaging object of the infrared image is within the body temperature range, it may be determined that the imaging object of the infrared image is the living body; or otherwise, it may be determined that the imaging object of the infrared image is not the living body.

In this embodiment, according to whether the imaging outline matches the preset face outline and whether the temperature of the imaging object is within the body temperature range, it is determined that whether the imaging object is the living body and thus the accuracy rate of liveness identification is improved.

Figure 4:
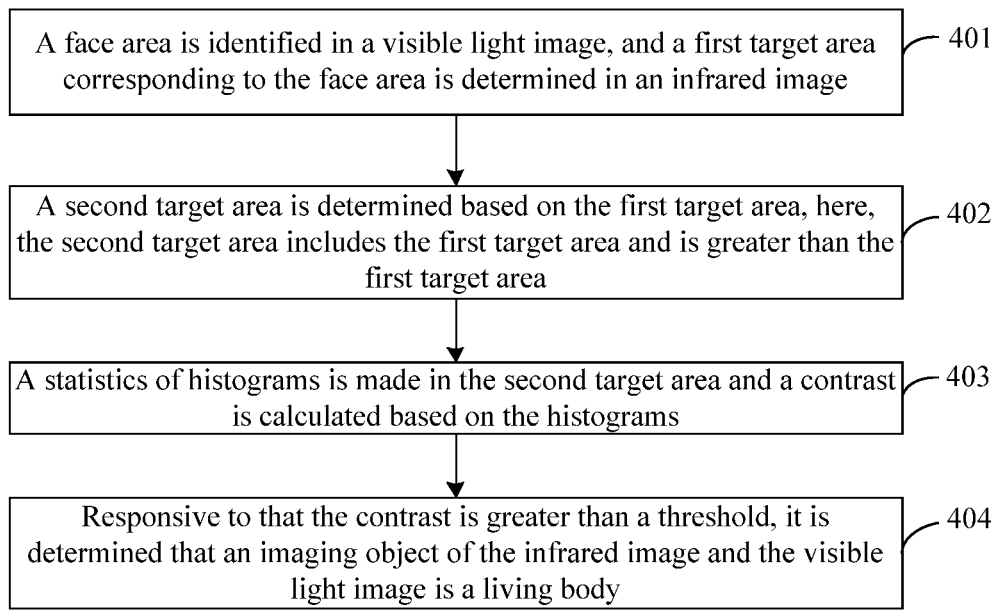
FIG. 4 is a flowchart diagram of a method for performing liveness detection based on an infrared image and a visible light image according to an embodiment of the disclosure.

In the above embodiment, the image sensor controlled by the special hardware to start may include an infrared sensor and a visible light sensor; and an infrared image is obtained by the infrared sensor through the imaging and a visible light image is obtained by the visible light sensor through the imaging. When the liveness detection is performed, the liveness detection may be performed on the imaging object based on the infrared image and the visible light image. FIG. 4 is a flowchart diagram of a method for performing liveness detection based on an infrared image and a visible light image according to an embodiment of the disclosure.

As illustrated in FIG. 4, the liveness detection method may include the following operations.

At block 401, a face area is identified in a visible light image, and a first target area corresponding to the face area is determined in an infrared image.

In this embodiment, the face area is detected on the visible light image; and when no face area is detected, a visible light image and an infrared image are re-acquired. When the face is detected, a face outline is identified in the infrared image, and the first target area corresponding to the face area in the visible light image is determined. It may be understood that the first target area is the face area in the infrared image.

At block 402, a second target area is determined based on the first target area, here, the second target area includes the first target area and is greater than the first target area.

The second target area is obtained by expanding the range on the basis of the first target area in the infrared image. It may be understood that the second target area includes the first target area and is greater than the first target area.

At block 403, a statistics of histograms is made in the second target area and a contrast is calculated based on the histograms.

The statistics of the histograms is made in the second target area of the infrared image, which is as shown in the formula (1).

$$C = \Sigma_\delta \delta(i,j)^2 p_\delta(i,j) \qquad (1)$$

Where $\delta(i,j) = |i-j|$ is a gray level difference between adjacent pixels, and $p_\delta(i,j)$ is a pixel distribution probability of the gray level difference between the adjacent pixels.

At block 404, when the contrast is greater than a threshold, it is determined that an imaging object of the infrared image and the visible light image is a living body.

When the contrast is greater than a certain threshold, it may be determined that the imaging object of the infrared image and the visible light image is the living body; or otherwise, the imaging object is an artificial article.

In this embodiment, whether the imaging object is the living body is determined based on the infrared image and the visible light image, so that the accuracy rate of the liveness detection is improved.

Further, on the premise of improving the security and reliability of the identity verification that is performed by using the face, the energy of the electronic device can be saved, and the endurance capacity is improved. When the image sensor controlled to perform imaging further includes the infrared sensor, the infrared sensor is controlled by special hardware to start for imaging. When it is determined based on the infrared image obtained by the infrared sensor through the imaging that the imaging object is the living body, a structured light sensor is controlled to perform imaging.

Specifically, a floodlight is modulated by special hardware MCU to emit infrared light, and the infrared light is irradiated to an imaging object. The infrared light is hindered by the imaging object and is reflected by the imaging object; and the infrared sensor receives the infrared light reflected by the imaging object to perform imaging.

The infrared image obtained by the infrared sensor through the imaging is acquired by the MCU and the liveness detection is performed on the imaging object based on the infrared image. Herein, the specific detection method may refer to the method described in the above embodiment and will not be repeated.

When it is determined based on the infrared image that the imaging object is the living body, then the structured light sensor is controlled to perform imaging so as to perform identity verification based on a structured light depth model.

In this embodiment, the infrared sensor is controlled to perform imaging, and after it is determined based on the infrared image that the imaging object is the living body, the structured light sensor is controlled to perform imaging. In such manner, the structured light sensor does not need to be in a working state all the time, and thus the battery level of the electronic device may be well saved and the endurance capability of the electronic device is improved.

It may be understood that in order to improve the speed of identity verification, the infrared sensor and the structured light sensor in the image sensor may be simultaneously controlled to perform imaging, so that after it is determined that the imaging object is the living body based on the infrared image, the identity verification is performed directly based on imaging data obtained by the imaging of the structured light sensor, thereby improving the speed of identity verification.

In the above embodiment, when the image sensor controlled to perform imaging includes a visible light sensor, an infrared sensor and a structured light sensor. In order to save the energy of the electronic device, the visible light sensor and the infrared sensor may be firstly controlled to perform imaging. When it is determined that the imaging object is a living body based on an infrared image obtained by the imaging of the infrared sensor and a visible light image obtained by the imaging of the visible light sensor, then the structured light sensor is controlled to perform imaging.

The process for detecting whether the imaging object is the living body based on the visible light image and the infrared image may refer to the method in the above embodiment and will not be repeated herein.

In this embodiment, the visible light sensor and the infrared sensor are firstly controlled to perform imaging, and after it is determined based on the visible light image and the infrared image that the imaging object is the living body, the structured light sensor is controlled to perform imaging so as to perform the identity verification based on a structured light depth model. The liveness detection is performed before the identity verification is performed. Therefore, the reliability and security of the identity verification that is performed by using the face are improved; and moreover, the structured light sensor does not need to be in an imaging working state all the time, the energy of the electronic device is greatly saved, and the endurance capability of the electronic device is improved.

Figure 5:
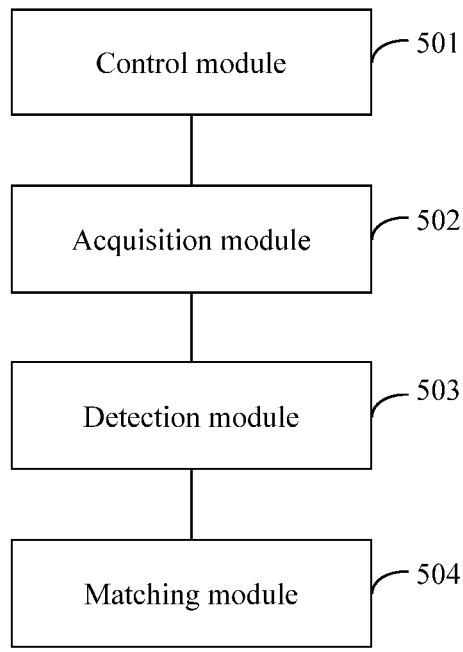
FIG. 5 is a structural diagram of a device for face identification according to an embodiment of the disclosure.

An embodiment of the disclosure further discloses a device for face identification. FIG. 5 is a structural diagram of a device for face identification according to an embodiment of the disclosure.

As illustrated in FIG. 5, the device may include: a control module 501, an acquisition module 502, a detection module 503 and a matching module 504.

The control module 501 is configured to control an image sensor to perform imaging, where the image sensor includes a structured light sensor.

The acquisition module 502 is configured to acquire imaging data obtained by the image sensor through the imaging.

The detection module 503 is configured to perform liveness detection on an imaging object based on the imaging data.

The matching module 504 is configured to match, responsive to that the liveness detection succeeds, a structured light depth model constructed based on depth data in the imaging data with a preset face depth model; and determine, responsive to that the structured light depth model matches the preset face depth model, that identity verification succeeds.

In a possible implementation manner of this embodiment, the image sensor further includes an infrared sensor, the imaging data includes an infrared image, and the detection module 503 is further configured to: identity whether an imaging object of the infrared image is a living body based on the infrared image in the imaging data.

Further, in a possible implementation manner of this embodiment, the detection module 503 is further configured to: extract an imaging outline from an infrared image; determine, based on local infrared images inside the imaging outline, a temperature of an imaging object of the infrared image; and determine, responsive to that the imaging outline matches a preset face outline and the temperature of the imaging object of the infrared image is within a body temperature range, that the imaging object of the infrared image is a living body.

In a possible implementation manner of this embodiment, the image sensor further includes an infrared sensor and a visible light sensor, the imaging data includes an infrared image and a visible light image, and the detection module 503 is further configured to: identify a face area in the visible light image, and determine a first target area corresponding to the face area from the infrared image; determine, based on the first target area, a second target area including the first target area and greater than the first target area; make a statistics of histograms in the second target area and calculate a contrast based on the histograms; and determine, when the contrast is greater than a threshold, that an imaging object of the infrared image and the visible light image is a living body.

In a possible implementation manner of this embodiment, the control module 501 is further configured to: control an infrared sensor in the image sensor to perform imaging; and control, responsive to that it is determined based on the infrared image obtained by the infrared sensor through the imaging that the imaging object is the living body, a structured light sensor to perform imaging.

In a possible implementation manner of this embodiment, the control module 501 is further configured to: simultaneously control an infrared sensor and a structured light sensor in the image sensor to perform imaging.

In a possible implementation manner of this embodiment, the control module 501 is further configured to: control an infrared sensor and a visible light sensor in the image sensor to perform imaging; and control, responsive to that it is determined that the imaging object is a living body based on an infrared image obtained by the infrared sensor through the imaging and a visible light image obtained by the visible light sensor through the imaging, the structured light sensor to perform imaging.

In a possible implementation manner of this embodiment, the device for face identification may be provided with a trusted execution environment, the control module 501 is further configured to control, by special hardware of the trusted execution environment, the image sensor to perform imaging; and the acquisition module 502 may obtain, by special hardware, imaging data obtained by the image sensor through the imaging.

In the foregoing identity verification and liveness detection processes, the imaging data required for the identity verification and liveness detection is acquired by special hardware, thus guaranteeing the security of data sources for the identity verification and liveness detection and further improving the security and reliability.

The division of each module in the device for face identification is merely for exemplary description. In other embodiments, the device for face identification may be divided into different modules as required to complete the functions of the device for face identification wholly or partially.

It is to be noted that the foregoing description on the embodiment of the method for face identification is also applied to the device for face identification in this embodiment and will not be repeated herein.

According to the device for face identification in this embodiment of the disclosure, the image sensor is controlled to perform imaging; the imaging data obtained by the image sensor through the imaging is acquired; the liveness detection is performed on the imaging object based on the imaging data; responsive to that the liveness detection succeeds, the structured light depth model constructed based on the depth data in the imaging data is matched with the preset face depth model; and responsive to that the structured light depth model matches the preset face depth model, it is determined that the identity verification succeeds. In this embodiment, the liveness detection is performed based on the imaging data, and the verification on the face depth model is performed based on the structured light depth model after the liveness detection succeeds. Since the verification on the face depth model is performed after the liveness detection succeeds, a situation in which the identity verification is passed by using the artificial article such as the photo may be prevented, and the security and reliability for the identity verification with the face are improved.

A method for image processing (hereinafter referred as a method for face identification collectively) and a device for image processing (hereinafter referred to as a device for face identification collectively) in another embodiment of the disclosure will be described below with reference to the accompanying drawings.

At present, imaging data of a face is acquired by an image sensor on an electronic device, and then the identity verification is performed based on the imaging data. However, at present, for the identity verification performed by directly invoking the image sensor to acquire the image, the verification manner is single and the security is low. Moreover, when the image is acquired by the image sensor, the energy consumption is large; and the endurance capability of an electronic device is affected by direct invoking.

For the above problem, an embodiment of the disclosure discloses a method for face identification. By performing liveness detection after it is determined that an imaging object is a pre-stored imaging object, a situation in which the verification is passed by using an artificial article such as a photo may be prevented, and the security and reliability of the identity verification are improved. After it is determined that the imaging object matches the pre-stored imaging object, the image sensor is started, so that the image sensor does not need to be in an on state all the time, the electric quantity of an electronic device may be well saved and the endurance capability of the electronic device is improved.

Figure 6:
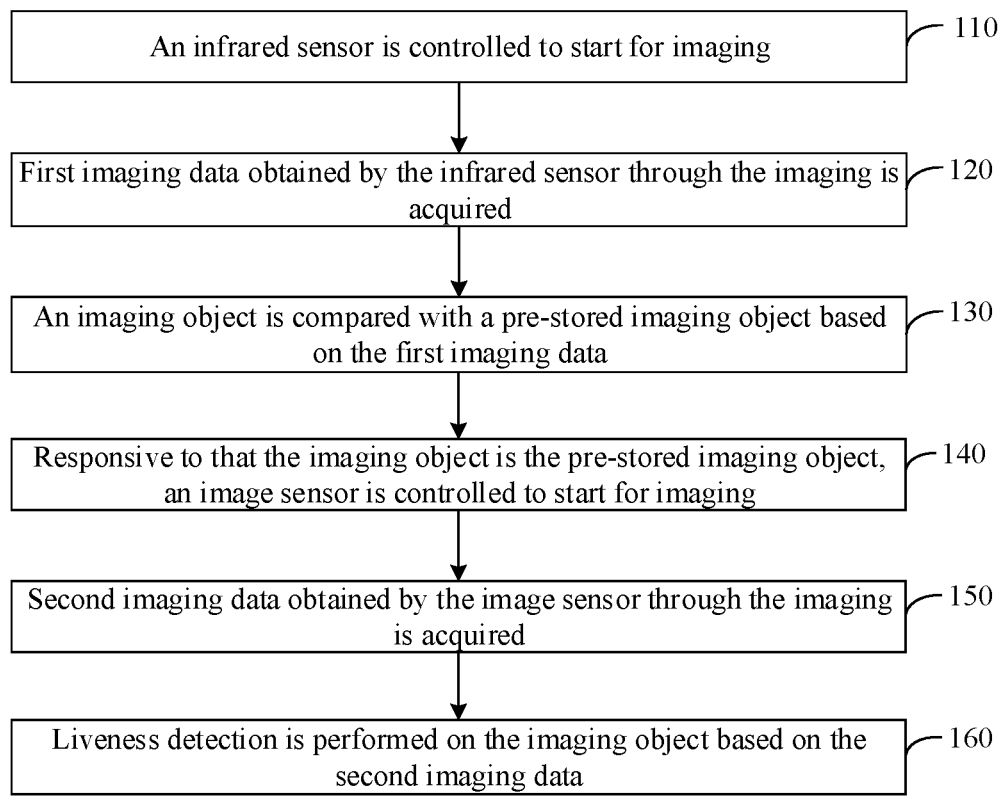
FIG. 6 is a flowchart diagram of another method for face identification according to an embodiment of the disclosure.

FIG. 6 is a flowchart diagram of a method for face identification provided by an embodiment of the disclosure.

The method for face identification is applied to an electronic device. As a possible implementation manner, a structure of the electronic device may refer to FIG. 2. FIG. 2 is a structural diagram of an electronic device according to an embodiment of the disclosure.

As illustrated in FIG. 2, the electronic device includes: a laser camera, a floodlight, a visible light camera, a laser lamp and a Microcontroller Unit (abbreviated as MCU). The MCU includes a Pulse Width Modulation (abbreviated as PWM), a depth engine, a bus interface and a Random Access Memory (RAM). In addition, the electronic device further includes a processor. The processor is provided with a trusted execution environment; the MCU is special hardware of the trusted execution environment, and a trusted application for executing the method illustrated in FIG. 6 is run in the trusted execution environment. The processor may further be provided with a rich execution environment, and the rich execution environment and the trusted execution environment are isolated from each other. It is to be noted that the application of the method illustrated in FIG. 6 may also be run in a rich execution environment.

It is to be noted that a person skilled in the art may know that the method in FIG. 6 is not limited to the electronic device illustrated in FIG. 2, the electronic device illustrated in FIG. 2 is merely taken as a schematic description, and the method in FIG. 6 may further be used in other electronic devices having a trusted execution environment and special hardware of the trusted execution environment, which is not limited by this embodiment thereto.

The PWM is configured to modulate the floodlight to emit infrared light and modulate the laser lamp to emit structured light; the laser camera is configured to acquire a structured light image or a visible light image of an imaging object; the depth engine is configured to calculate, based on the structured light image, to acquire depth data corresponding to the imaging object; and the bus interface is configured to send the depth data to the processor and the trusted application run on the processor executes a corresponding operation with the depth data. The bus interface includes: a Mobile Industry Processor Interface (abbreviated as MIPI), an I2C synchronous serial bus interface, and a Serial Peripheral Interface (abbreviated as SPI).

As illustrated in FIG. 6, the method for face identification may include the following operations.

At block 110, an infrared sensor is controlled to start for imaging.

In this embodiment, the method for face identification may be executed by a trusted application, where the trusted application is run in a trusted execution environment, the trusted application may be understood as an application involving the security of information such as a user resource and a user privacy, and such type of application like an e-payment program and an unlocking program requires a high security level.

The trusted execution environment is a security area on a main processor of an electronic device (such as an intelligent mobile phone and a tablet computer), and may ensue the security, confidentiality and integrity of codes and data loaded to the environment compared with the rich execution environment. The trusted execution environment provides an isolated execution environment and the provided security characteristics include: isolated execution, integrity of the trusted application, confidentiality of trusted data, security storage, etc. To sum up, the execution space provided by the trusted execution environment provides a higher level of security than a common mobile operation system such as ISO and Android.

In this embodiment, the trusted application is run in the trusted execution environment, and thus the security of identity verification is improved from an operation environment.

In this embodiment, the electronic device may include an infrared sensor, a visible light sensor and a structured light sensor. The infrared sensor may perform infrared imaging based on infrared light reflected by the imaging object to obtain an infrared image; the visible light sensor may perform imaging by using visible light reflected by the imaging object to obtain a visible light image; and the structured light sensor may perform imaging based on structured light reflected by the imaging object to obtain a structured light image.

The imaging object may be a face and may also be other characteristic site such as a handle, an eye and a mouth.

When the trusted application is run, such as the e-payment and electronic device unlocking are performed, the infrared sensor may be controlled by the special hardware of the trusted execution environment to start for imaging. The special hardware may be an MCU.

In this embodiment, the infrared sensor may include a laser camera and a floodlight. The MCU may modulate the floodlight on the electronic device to emit the infrared light to project to an imaging object; the infrared light is hindered by the imaging object and is reflected by the imaging object; and the laser camera captures the infrared light reflected by the imaging object to perform imaging.

At block 120, first imaging data obtained by the infrared sensor through the imaging is acquired.

In this embodiment, the first imaging data obtained by the imaging of the infrared sensor may be acquired by special hardware such as MCU. Specifically, the special hardware obtains the first imaging data (i.e., infrared image) based on an imaging result of the infrared sensor.

At block 130, an imaging object is compared with a pre-stored imaging object based on the first imaging data.

In this embodiment, since characteristics of body sites of each person are different generally, a body site may be selected as the imaging object. For example, the imaging object may be the body site such as a face, a facial organ (eye, nose and mouth) or a hand. After the first imaging data (i.e., the infrared image) of the imaging object is acquired, an imaging outline may be extracted from the infrared image. Specifically, edge pixel points of the infrared image and pixel points each having a similar pixel value may be extracted to obtain the imaging outline.

Then, the imaging outline is matched with a pre-stored imaging outline of an imaging object. As an example, the imaging outline may be matched in stages; and when the level of similarity in each stage is greater than a preset threshold of the stage, it may be considered that the imaging outline matches the preset face outline, i.e., the imaging object is the pre-stored imaging object.

Specifically, the pixel points at the edge of the image and pixel points whose difference in pixel values is less than a preset threshold (i.e., pixel points each having similar pixel value) may be extracted from the infrared image, to obtain the imaging outline.

When the imaging outline is compared with the preset face outline, the face outline may be divided into an upper half portion and a lower half portion with eyebrows as a dividing line, and the comparison is made in stages. Since the upper half portion (including the eyebrows) is affected by eyebrow shapes and a hairstyle, the relative change is large and the confidence level is low. The lower half portion, such as eyes, eyebrows, nose and mouth, is fixed, so a preset threshold of the similarity corresponding to the upper half portion is less than a preset threshold of the similarity corresponding to the lower half portion.

By respectively comparing the two portions, when the similarity between an upper half portion of the imaging outline and the upper half portion of the pre-stored face outline is greater than a corresponding preset threshold and the similarity between a lower half portion of the imaging outline and the lower half portion of the pre-stored face outline is greater than a corresponding preset threshold, it may be considered that the imaging outline matches the pre-stored face outline, i.e., the imaging object is the pre-stored face.

At block 140, responsive to that the imaging object is the pre-stored imaging object, an image sensor is controlled to start for imaging.

When the imaging object is the pre-stored imaging object, it may be indicated that the imaging object pertains to an owner of the electronic device, and at this moment, the image sensor may be controlled to start. The image sensor started herein may be a visible light sensor or a structured light sensor, and may also be the visible light sensor and the structured light sensor.

In this embodiment, the visible light sensor includes a visible light camera, which can capture visible light reflected by the imaging object for imaging to obtain a visible light image. The structured light sensor includes a laser lamp, and a laser camera shared with the infrared sensor. The PWM may modulate the laser lamp to emit structured light, the structured light is irradiated to the imaging object, and the laser camera may capture the structured light reflected by the imaging object to perform imaging to obtain a structured light image.

After it is determined that the imaging object matches the pre-stored imaging object, the image sensor is started, so that the image sensor does not need to be in an on state all the time, the electric quantity of an electronic device may be well saved and the endurance capability of the electronic device is improved.

At block 150, second imaging data obtained by the image sensor through the imaging is acquired.

In this embodiment, when the sensor started is the visible light sensor, the second data (i.e., a visible light image) obtained by imaging of the visible light sensor may be acquired by special hardware. When the sensor started is the structured light sensor, a structured light image obtained by imaging of the structured light sensor may be acquired by special hardware. The depth engine may calculate based on the structured light image to obtain depth data corresponding to the imaging object. Specifically, the depth engine demodulates phase information corresponding to a pixel at a deformation position in the structured light image, converts the phase information into height information, determines depth data corresponding to a photographed object based on the height information and obtains a depth image based on the depth data. When the sensor started is the visible light sensor and the structured light sensor, a visible light image and a depth image may be acquired by special hardware.

At block 160, liveness detection is performed on the imaging object based on the second imaging data.

In this embodiment, the liveness detection may be performed based on the depth image, the liveness detection may also be performed based on the visible light image, and the liveness detection may also be performed based on the visible light image and the infrared image. The specific process may refer to the subsequent embodiment in detail.

According to the method for face identification in this embodiment of the disclosure, the infrared light sensor is started first, after it is determined that the imaging object matches the pre-stored image object, the image sensor is started and the liveness detection is performed, so not only the energy may be saved, but also the security and reliability of the identity verification may be improved. After it is determined that the imaging object matches the pre-stored imaging object, the image sensor is started, so that the image sensor does not need to be in an on state all the time, the battery level of an electronic device may be well saved and the endurance capability of the electronic device is improved.

The method for face identification in this embodiment of the disclosure may be executed by a trusted application and the trusted application is run in a trusted execution environment. In the foregoing identity verification process, the imaging data for the identity verification is acquired by special hardware under a trusted environment, thus guaranteeing the security of data sources for the identity verification and liveness detection and further improving the security and reliability of the identity verification.

Figure 7:
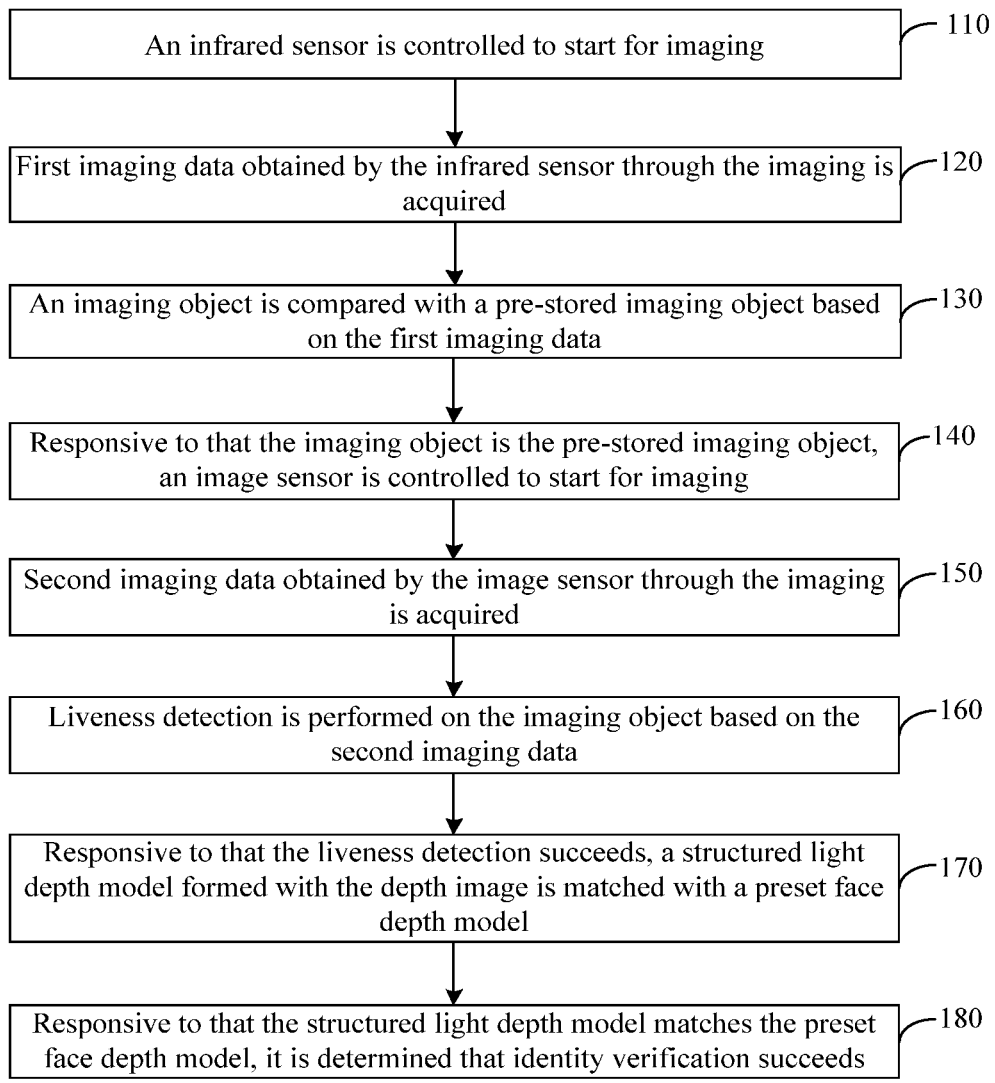
FIG. 7 is a flowchart diagram of yet another method for face identification according to an embodiment of the disclosure.

Further, as illustrated in FIG. 7, on the basis of FIG. 6, after the operation 160, the method for face identification may further include the following operations.

At block 170, responsive to that the liveness detection succeeds, a structured light depth model formed with the depth image is matched with a preset face depth model.

When the imaging object passes through the liveness detection, the identity verification is performed according to the structured light depth model. Specifically, the structured light depth model is constructed based on the depth data in the depth image and is matched with the preset face depth model. Particularly, a structured light depth model of each organ of the face in the constructed structured light depth model may be compared with a depth model of each organ in the preset face depth model; and when the similarity is greater than a preset threshold, it may be considered that the structured light depth model matches the preset face depth model.

It may be understood that the preset face depth model is pre-stored and is constructed based on depth data in a structured light image obtained by the structured light sensor through imaging a face of an owner of an electronic device. The preset face depth model is used for the identity verification.

At block 180, responsive to that the structured light depth model matches the preset face depth model, it is determined that identity verification succeeds.

When the structured light depth model matches the preset face depth model, it is determined that the identity verification is passed and subsequent operations, such as e-payment and electronic device unlocking, may be performed.

It may be understood that responsive to that the imaging object does not pass through the liveness detection, a message that the liveness detection fails may be returned; or responsive to that the structured light depth model of the imaging object does not match the preset face depth model, a message that identity verification fails is returned.

According to the method for face identification provided by this embodiment of the disclosure, after the imaging object passes through the liveness detection, i.e., when it is confirmed that the object for the identity verification is not the artificial article (photo), the identity verification is performed, and thus the security and reliability of the identity verification are improved.

Figure 8:
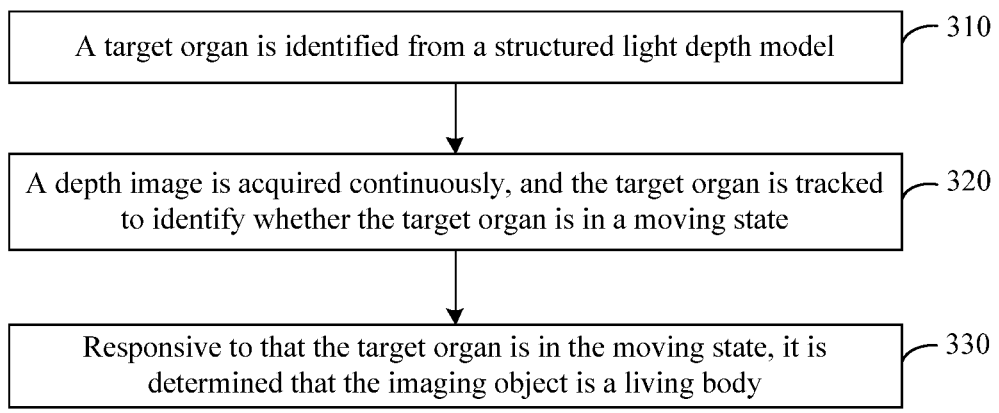
FIG. 8 is a flowchart diagram of a method for performing liveness detection based on a structured light image according to an embodiment of the disclosure.

Different second imaging data results in different methods for performing liveness detection. When the second imaging data is the structured light image, an embodiment of the disclosure provides a method for performing liveness detection. FIG. 8 is a flowchart diagram of a method for performing liveness detection based on a structured light image according to an embodiment of the disclosure. As illustrated by FIG. 8, the method may include the following operations.

At block 310, a target organ is identified from a structured light depth model.

In this embodiment, structured light depth models for a plurality of body organs may be stored in advance. After a structured light image of an imaging object is acquired by special hardware, depth data is acquired from the structured light image, the depth data constitutes a depth image, a structured light depth model is constructed based on the depth image, and the structured light depth model is compared with the pre-stored structured light depth models of the organs to identify the target organ from the structured light depth model.

For example, organs such as eyebrows, eyes, nose and mouth are identified from a structured light depth model of a face.

At block 320, a depth image is acquired continuously, and the target organ is tracked to identify whether the target organ is in a moving state.

When the imaging object is a living body, it is impossible for the imaging object to keep stationary all the time; and when a certain organ is in a moving state, the depth data of the organ will also change. Therefore, whether the target organ is in the moving state is determined by tracking the target organ in this embodiment.

Specifically, after the target organ is identified, a depth image of the imaging object is acquired continuously to acquire continuous multiple frames of depth images. By comparing depth data of a same organ in the continuous multiple frames of depth images, whether the organ is in the moving state is determined. When the depth data of the same organ in the continuous multiple frames of depth images changes, it may be determined that the organ is in the moving state.

For example, the target organ is the mouth and is in a closed state in the current acquired depth image, and after several frames of depth images, the mouth is in an open state, so it may be determined that the mouth is in the moving state.

At block 330, responsive to that the target organ is in the moving state, it is determined that the imaging object is a living body.

When the target organ is in the moving state, it is indicated that the imaging object is not the artificial article such as the photo and thus it may be determined that the imaging object is the living body. When the target organ is in a stationary state, it may be determined that the imaging object is not the living body and may be the artificial article such as the photo.

In this embodiment, by identifying the target organ from the structured light depth model and tracking the target organ, whether the target organ is in the moving state is determined and then whether the imaging object is the living body is determined, so the accuracy of the liveness detection is high.

Figure 9:
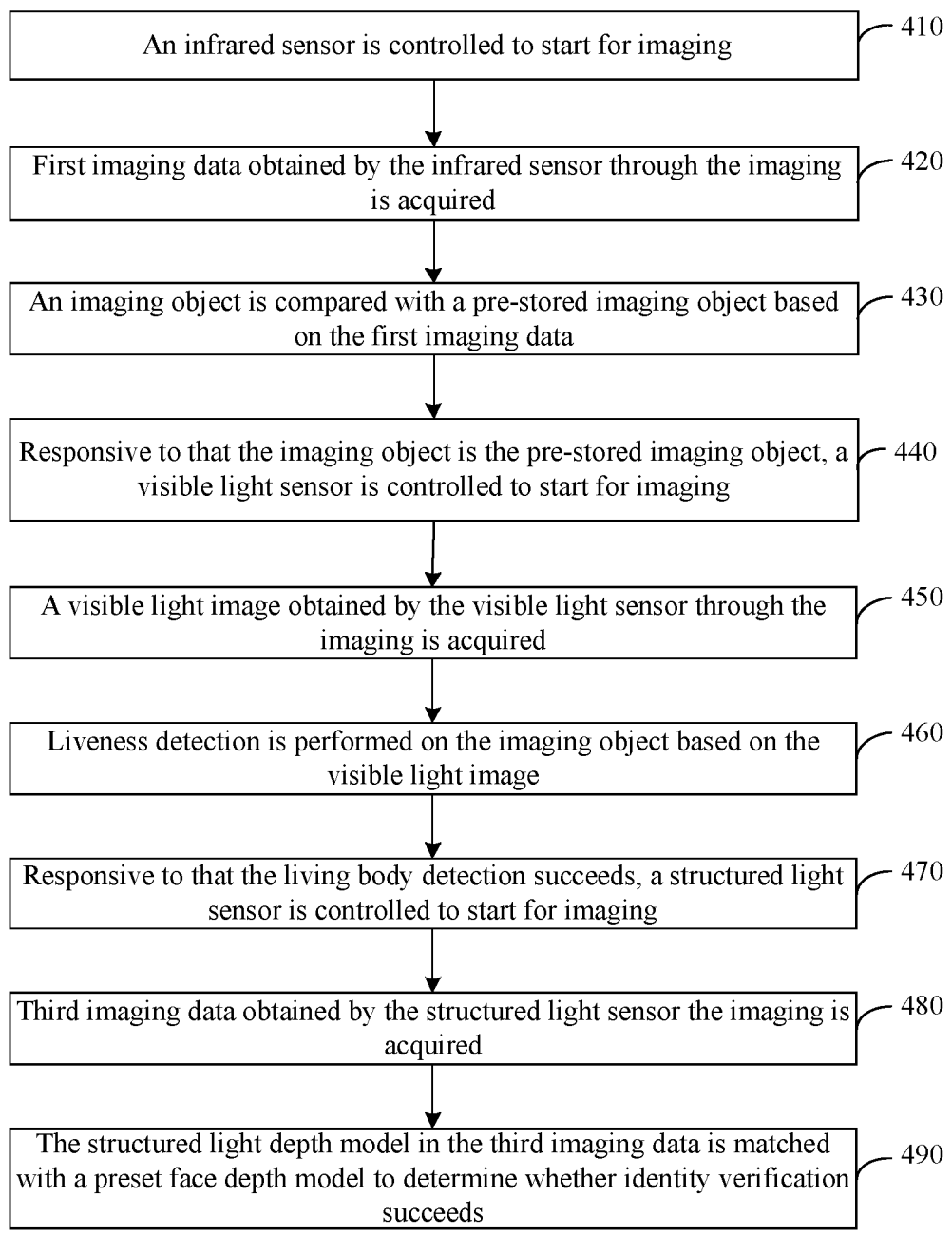
FIG. 9 is a flowchart diagram of a still yet another method for face identification according to an embodiment of the disclosure.

In the above embodiment, when it is determined that the imaging object is the pre-stored imaging object, the image sensor controlled to start may be the visible light sensor so as to detect whether the imaging object is the living body based on the visible light image. FIG. 9 is a flowchart diagram of a method for face identification according to an embodiment of the disclosure.

As illustrated in FIG. 9, the method may include the following operations.

At block 410, an infrared sensor is controlled to start for imaging.

At block 420, first imaging data obtained by the infrared sensor through the imaging is acquired.

At block 430, an imaging object is compared with a pre-stored imaging object based on the first imaging data.

In this embodiment, the method for determining whether the imaging object is matched with the pre-stored imaging object based on the first imaging data is similar to the method in operation 110 to operation 130 in the above embodiment and will not be repeated thereto.

At block 440, responsive to that the imaging object is the pre-stored imaging object, a visible light sensor is controlled to start for imaging.

When the imaging object is the pre-stored imaging object, the visible light sensor is controlled to start so that visible light reflected by the imaging object is imaged on the visible light sensor.

At block 450, a visible light image obtained by the visible light sensor through the imaging is acquired.

In this embodiment, a value of each pixel point obtained by the imaging of the visible light sensor may be acquired by special hardware such as an MCU, thereby obtaining the visible light image.

At block 460, liveness detection is performed on the imaging object based on the visible light image.

Figure 10:
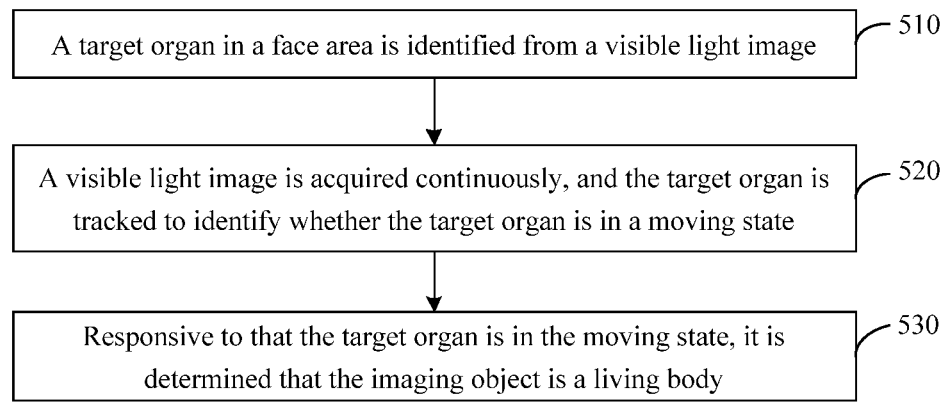
FIG. 10 is a flowchart diagram of a method for performing liveness detection based on a visible light image according to an embodiment of the disclosure.

As a possible implementation manner, the liveness detection may be performed on the imaging object only based on the visible light image. FIG. 10 is a flowchart diagram of a method for performing liveness detection based on a visible light image according to an embodiment of the disclosure. As illustrated in FIG. 10, the liveness detection method may include the following operations.

At block 510, a target organ in a face area is identified from a visible light image.

In this embodiment, visible light images of multiple organs of the face may be stored in advance, a visible light image of an imaging object is compared with the pre-stored visible light images of the face organs, and the visible light image of the imaging object has an area of which pixel values similar as pixel values of the pre-stored visible light image of an organ and the area is determined as the organ.

For example, an area, which has pixel values similar as pixel values of the pre-stored visible light image of the nose, of the visible light image of the imaging object is identified as the nose.

At block 520, a visible light image is acquired continuously, and the target organ is tracked to identify whether the target organ is in a moving state.

When the imaging object is a living body, it is impossible for the imaging object to keep stationary all the time; and when some organ is in the moving state, the depth data will also change. Therefore, whether the target organ is in the moving state is determined by tracking the target organ in this embodiment.

Specifically, after the target organ in the face area is identified, the visible light image of the face is continuously acquired to obtain continuous multiple frames of visible light images of the face. By comparing relative positions of the target organs in the continuous two frames or multiple frames of visible light images, whether the target organ is in the moving state is determined.

When the relative positions of the target organ change, it may be considered that the target organ is in the moving state.

At block 530, responsive to the target organ is in the moving state, it is determined that the imaging object is a living body.

When the target organ is in the moving state, it may be determined that the face is the living body but not a face in an artificial article such as a photo and thus it is indicated that the face passes through the liveness detection. When the target organ is in a stationary state, it may be considered that the face is not the living body but the artificial article and thus it is indicated that the face does not pass through the liveness detection.

As another possible implementation manner, the liveness detection may further be performed on the face based on a visible light image and an infrared image. FIG. 4 is a flowchart diagram of a method for performing liveness detection based on a visible light image and an infrared image according to an embodiment of the disclosure. As illustrated in FIG. 4, the method may include the following operations.

At block 401, a face area is identified in a visible light image, and a first target area corresponding to the face area is determined in an infrared image.

In this embodiment, the face area is identified in the visible light image; and when no face area is detected, a visible light image and an infrared image are re-acquired. When the face is detected, a face outline is identified in the infrared image, and the first target area corresponding to the face area in the visible light image is determined. It may be understood that the first target area is a face area in the infrared image.

At block 402, a second target area is determined based on the first target area, here, the second target area includes the first target area and is greater than the first target area.

By expanding the range on the basis of the first target area in the infrared image, the second target area is obtained. It may be understood that the second target area includes the first target area and is greater than the first target area.

At block 403, a statistics of histograms is made in the second target area and a contrast is calculated based on the histograms.

The statistics of the histograms is made in the second target area of the infrared image, as shown in the formula (1).

$$C = \Sigma_\delta \delta(i,j)^2 p_\delta(i,j) \qquad (1)$$

Where $\delta(i,j) = |i-j|$ is a gray level difference between adjacent pixels, and $p_\delta(i,j)$ is a pixel distribution probability of the gray level difference between the adjacent pixels.

At block 404, responsive to that the contrast is greater than a threshold, it is determined that an imaging object of the infrared image and the visible light image is a living body.

When the contrast is greater than a certain threshold, it may be determined that the imaging object of the infrared image and the visible light image is the living body; or otherwise, the imaging object is an artificial article.

At block 470, responsive to that the liveness detection succeeds, a structured light sensor is controlled to start for imaging.

In this embodiment, when it is detected that the imaging object is the living body, the structured light sensor may be controlled by special hardware to start. Specifically, a laser lamp may be modulated by special hardware to emit structured light, and the structured light is projected to the imaging object; and after the structured light is reflected by the imaging object, the structured light sensor performs imaging on the imaging object based on the structured light reflected by the imaging object.

At block 480, third imaging data obtained by the structured light sensor through the imaging is acquired.

In this embodiment, the structured light sensor may perform imaging based on the structured light reflected by the imaging object to obtain a structured light image. Depth data may be acquired by special hardware based on the structured light image, and then a structured light depth model of the imaging object is constructed and obtained based on the depth data. Therefore, the third imaging data include the structured light depth model.

At block 490, the structured light depth model in the third imaging data is matched with a preset face depth model to determine whether identity verification succeeds.

In this embodiment, when the imaging object passes through the liveness detection, the identity verification is performed according to the structured light depth model. Specifically, the structured light depth model is matched with the preset face depth model. Particularly, a structured light depth model of each organ of the face in the constructed structured light depth model may be compared with a depth model of each organ in the preset face depth model; and when the similarity is greater than a preset threshold, it may be considered that the structured light depth model matches the preset face depth model and may be determined that the identity verification is passed.

Upon the determination of the identity verification, an electronic device performs an operation carried out only after the identity verification is passed, such as completion of e-payment and unlocking.

According to the method for face identification in this embodiment of the disclosure, whether the imaging object pertains to an owner of the electronic device is determined based on the first imaging data; after it is determined that the imaging object pertains to the owner of the electronic device, the visible light sensor is started, and the liveness detection is performed based on the visible light image. After it is determined that the imaging object is the living body based on the visible light image, the structured light sensor is started so as to perform the identity verification based on a structured light depth model. Since the visible light sensor and the structured light sensor do not need to be in the on state all the time, the energy of the electronic device may be saved and the endurance capability of the electronic device is improved. Furthermore, in this embodiment, whether the imaging object pertains to the owner of the electronic device is determined at first, and in the case of the imaging object pertains to the owner of the electronic device, the liveness detection is performed, so the security and reliability of the identity verification may be improved.

According to the method for face identification in this embodiment of the disclosure, the infrared sensor is controlled to start for imaging, and after it is determined based on the imaging data obtained by the imaging of the infrared sensor that the imaging object is the pre-stored imaging object, the image sensor is controlled to start for imaging so as to perform the liveness detection based on the imaging data obtained by the imaging of the image sensor. Since the liveness detection is performed after it is determined that the imaging object is the pre-stored image object, the situation in which the identity verification is passed by using the artificial article such as the photo may be prevented, and the security and reliability for the identity verification are improved. After it is determined that the imaging object matches the pre-stored imaging object, the image sensor is started, so that the image sensor does not need to be in an on state all the time, the electric quantity of an electronic device may be well saved and the endurance capability of the electronic device is improved.

Figure 11:
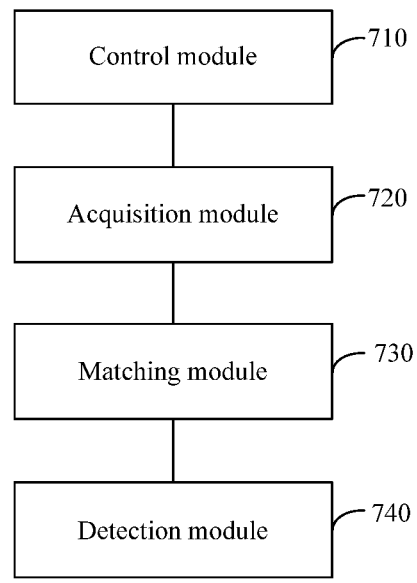
FIG. 11 is a structural diagram of a device for face identification according to an embodiment of the disclosure.

In order to implement the above embodiment, the disclosure further discloses a device for image processing. As illustrated in FIG. 11, the device may include: a control module 710, an acquisition module 720, a matching module 730 and a detection module 740.

The control module 710 is configured to control an infrared sensor to perform imaging, and control, responsive to that it is determined by comparison that an imaging object is a pre-stored imaging object, to start an image sensor for imaging.

The acquisition module 720 is configured to acquire first imaging data obtained by the infrared sensor through the imaging and acquire second imaging data obtained by the image sensor through the imaging.

The matching module 730 is configured to compare the imaging object with the pre-stored imaging object based on the first imaging data.

The detection module 740 is configured to perform liveness detection on the imaging object based on the second imaging data.

In a possible implementation manner of this embodiment, the device may further include the matching module 730 and a determination module.

The matching module 730 is further configured to match, responsive to that the liveness detection succeeds, a structured light depth model formed with a depth image with a preset face depth model.

The determination module is configured to determine, responsive to that the structured light depth model matches the preset face depth model, that identity verification succeeds.

In a possible implementation manner of this embodiment, the detection module 740 is further configured to: identify a target organ from a structured light depth model, continuously acquire a depth image, and track the target organ to identify whether the target organ is in a moving state; and determine, responsive to that the target organ is in the moving state, that the imaging object is a living body.

In a possible implementation manner of this embodiment, the image sensor is a visible light sensor, the second image data include a visible light image and the device may further include the control module 710, the acquisition module 720, the matching module 730 and the determination module.

The control module 710 is further configured to control, responsive to that the liveness detection succeeds, a structured light sensor to start for imaging.

The acquisition module 720 is further configured to acquire third imaging data obtained by a structured light sensor though the imaging.

The matching module 730 is further configured to match a structured light depth model in the third imaging data with a preset face depth model.

The determination module is configured to determine, responsive to that the structured light depth model matches the preset face depth model, that identity verification succeeds.

In a possible implementation manner of this embodiment, the detection module 740 is further configured to: identify a target organ in a face area from a visible light image; acquire a visible light image continuously, and track the target organ to identify whether the target organ is in a moving state; and determine, responsive to that the target organ is in the moving state, that the imaging object is a living body.

In a possible implementation manner of this embodiment, the first imaging data are an infrared image, and the detection module 740 is further configured to: identify a face area in a visible light image, and determine, in an infrared image, a first target area corresponding to the face area; determine, based on the first target area, a second target area including the first target area and greater than the first target area; make a statistics of histograms in the second target area and calculate a contrast based on the histograms; and determine, when the contrast is greater than a threshold, that an imaging object of the infrared image and the visible light image is a living body.

In a possible implementation manner of this embodiment, the first imaging data are an infrared image, and the matching module 730 is further configured to: extract an imaging outline from an infrared image; match the imaging outline with an imaging outline of a pre-stored imaging object; and determine, responsive to that the imaging outline matches the imaging outline of the pre-stored imaging object, that the imaging object pertains to an owner of an electronic device.

In a possible implementation manner of this embodiment, the device for image processing may be provided with a trusted execution environment. In the identity verification process, the imaging data required for the identity verification are acquired by special hardware, thus guaranteeing the security of data sources for the identity verification and further improving the security and reliability.

The division of each module in the device for image processing is merely for exemplary description. In other embodiments, the device for image processing may be divided into different modules as required to complete the functions of the device for image processing wholly or partially.

It is to be noted that the foregoing description on the embodiment of the method for face identification is also applied to the device for image processing in this embodiment and will not be repeated herein.

According to the device for image processing in this embodiment of the disclosure, the infrared sensor is controlled to start for imaging, the first imaging data obtained by imaging of the infrared sensor is acquired, the imaging object is compared with the pre-stored imaging object based on the first imaging data, when the imaging object is the pre-stored imaging object, the image sensor is controlled to start for imaging, the second imaging data obtained by imaging of the image sensor is acquired and the liveness detection is performed on the imaging object based on the second imaging data. In this embodiment, the infrared sensor is controlled to start for imaging, and after it is determined that the imaging object is the pre-stored imaging object based on the imaging data obtained by the imaging of the infrared sensor, the image sensor is controlled to start for imaging so as to perform the liveness detection based on the imaging data obtained by the image sensor through the imaging. Since the liveness detection is performed after it is determined that the imaging object is the pre-stored image object, the situation in which the identity verification is passed by using the artificial article such as the photo may be prevented, and the security and reliability for the identity verification are improved. After it is determined that the imaging object matches the pre-stored imaging object, the image sensor is started, so that the image sensor does not need to be in an on state all the time, the electric quantity of an electronic device may be well saved and the endurance capability of the electronic device is improved.

Figure 12:
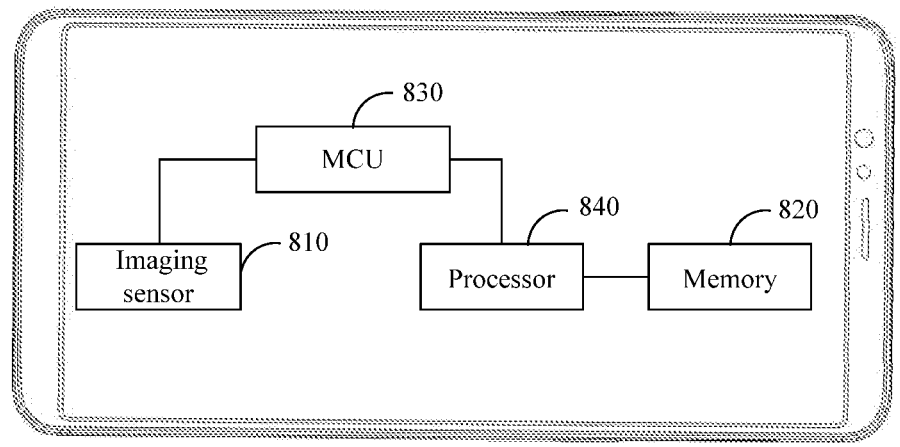
FIG. 12 is a structural diagram of a mobile terminal according to an embodiment of the disclosure.

An embodiment of the disclosure further discloses a mobile terminal. FIG. 12 is a structural diagram of a mobile terminal according to an embodiment of the disclosure.

In this embodiment, the mobile terminal includes but not limited to a device such as a mobile phone and a tablet computer.

As illustrated in FIG. 12, the mobile terminal may include: an imaging sensor 810, a memory 820, an MCU 830, a processor 840, and a trusted application stored on the memory 820 and capable of being run in a trusted execution environment of the processor 840.

The MCU 830 is special hardware of the trusted execution environment, is connected with the imaging sensor 810 and the processor 840, and is configured to control the imaging sensor 810 to perform imaging and send imaging data to the processor 840.

The processor 840 is configured to perform the method for face identification in the foregoing embodiments when executing the trusted application.

In a possible implementation manner of this embodiment, the MCU 830 communicates with the processor 840 in an encryption manner.

In this embodiment, the MCU 830 may encrypt an image by adopting a row and column pixel point scrambling method. Specifically, the MCU 830 may rearrange pixel information in an original image, and the processor may restore the original image via one-to-one correspondences.

A chaos-based image encryption method may also be adopted by the MCU 830. Specifically, two Logistic chaotic sequences are generated, two logistics are improved to obtain two y sequences, i.e., y1 and y2, and value substitution encryption is performed on the original image by y1 and y2 sequences. A key is an initial state value of a chaotic system.

In a possible implementation manner of this embodiment, the imaging sensor 810 may include: an infrared sensor, a structured light sensor and a visible light sensor.

The infrared sensor includes a laser camera and a floodlight. The structured light sensor includes a laser lamp and the laser camera shared with the infrared sensor. The visible light sensor includes a visible light camera.

In a possible implementation manner of this embodiment, the MCU 830 includes a PWM, a depth engine, a bus interface and an RAM.

The PWM is configured to modulate the floodlight to emit infrared light and modulate the laser lamp to emit structured light.

The laser camera is configured to acquire a structured light image of an imaging object.

The depth engine is configured to calculate, based on the structured light image, depth data corresponding to the imaging object.

The bus interface is configured to send the depth data to the processor 840, to enable a trusted application run on the processor 840 to execute a corresponding operation with the depth data.

For example, the identity verification may be performed based on the depth data, and the specific process may refer to the above embodiments and will not be repeated herein.

An embodiment of the disclosure further discloses a computer readable storage medium having stored thereon a computer program that, when executed by a processor, cause the processor to implement the method for face identification in the foregoing embodiments.

In the description of the disclosure, the terms "first" and "second" are merely for descriptive purpose and cannot be construed as indicating or suggesting a relative importance or implying the number of indicated technical features. Thus, a feature defined with "first" or "second" can explicitly or implicitly mean that at least one feature is included. In the description of the disclosure, "a plurality of" or "multiple" means two or more such as two and three unless otherwise defined clearly and specifically.

Any process or method described in a flowchart or described herein in other ways may be understood to include one or more modules, segments or portions of codes of executable instructions for achieving specific logical functions or operations in the process, and the scope of a preferred embodiment of the disclosure includes other implementations, not necessarily in the sequence illustrated or discussed here, but probably including the almost same or reverse sequence of the involved functions, which should be understood by those skilled in the art.

The logic and/or operation illustrated in the flowchart or described in other manners herein, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device that may include, store, communicate, propagate or transfer programs for use by or in combination with the instruction execution system, device or equipment. More specific examples (non-exhaustive list) of the computer readable medium include but not limited to an electrical connection portion (an electronic device) with one or more wires, a portable computer enclosure (a magnetic device), a Random Access Memory (RAM), a Read Only Memory (ROM), an Erasable Programmable Read-Only Memory (EPROM or a flash memory), an optical fiber device and a portable Compact Disk Read-Only Memory (CDROM). In addition, the computer readable medium may even be a paper or other appropriate medium capable of printing programs thereon, the program can be electronically captured, via, for instance, optical scanning of the paper or other medium, then compiled, interpreted or otherwise processed in a suitable manner if necessary, and then stored in a computer memory.

It should be understood that each part of the disclosure may be realized by the hardware, software, firmware or their combination. In the above embodiments, a plurality of operations or methods may be realized by the software or firmware stored in the memory and executed by the appropriate instruction execution system. For example, if implemented in the hardware, likewise in another embodiment, the operations or methods may be implemented by one or a combination of the following techniques known in the art: a discrete logic circuit having a logic gate circuit for implementing a logic function upon a data signal, an application-specific integrated circuit having an appropriate combination logic gate circuit, a Programmable Gate Array (PGA), a Field Programmable Gate Array (FPGA), etc.

Those of ordinary skilled in the art may understand that all or part of the operations of the embodiment methods may be completed by related hardware instructed by a program, the program may be stored in a computer readable storage medium, and the program includes one of operations in the method embodiments or a combination thereof during execution.

In addition, each function unit in each embodiment of the disclosure may be integrated into a processing module, each unit may also exist independently, and two or more than two unit may also be integrated into one module. The integrated module may be implemented in a hardware form, and may also be implemented in form of software function module. When being implemented in form of software function module and sold or used as an independent product, the integrated module of the disclosure may also be stored in a computer-readable storage medium.

The above-mentioned storage medium may be an ROM, a magnetic disk or an optical disc, etc. Although the embodiments of the disclosure have been illustrated and described, it would be appreciated that the above embodiments are exemplary and cannot be construed to limit the disclosure. Any changes, modifications, alternatives and variations may be made on the embodiments by those of ordinary skill in the art within the scope of the disclosure.

The invention claimed is:

1. A method for face identification, the method being applied to a mobile terminal and comprising:
controlling an infrared sensor to start for imaging;
acquiring first imaging data obtained by the infrared sensor through the imaging;
comparing an imaging object with a pre-stored imaging object based on the first imaging data;
responsive to that the imaging object is the pre-stored imaging object, performing an operation of controlling an image sensor to perform imaging;
wherein an imaging data obtained by the image sensor through the imaging is second imaging data; and
performing a liveness detection on the imaging object based on the second imaging data;
wherein the image sensor is a visible light sensor and the second imaging data comprises a visible light image, and performing the liveness detection on the imaging object based on the second imaging data comprises:
identifying a target organ in a face area from the visible light image;
continuously acquiring a visible light image, and tracking the target organ to identify whether the target organ is in a moving state; and
responsive to that the target organ is in the moving state, determining that the imaging object is a living body, or
wherein the first imaging data is an infrared image and performing the liveness detection on the imaging object based on the second imaging data comprises:
identifying a face area in the visible light image, and determining, in the infrared image, a first target area corresponding to the face area;
determining a second target area based on the first target area, the second target area comprising the first target area and being greater than the first target area;
making a statistics of histograms in the second target area and calculating a contrast based on the histograms; and
responsive to that the contrast is greater than a threshold, determining that an imaging object of the infrared image and the visible light image is a living body;
wherein the method further comprises:
after performing the liveness detection on the imaging object,
responsive to that the liveness detection succeeds, controlling a structured light sensor to start for imaging;
acquiring third imaging data obtained by the structured light sensor through the imaging;
matching a structured light depth model in the third imaging data with a preset face depth model; and
responsive to that the structured light depth model matches the preset face depth model, determining that identity verification succeeds.

2. The method of claim 1, wherein the image sensor is a structured light sensor and the second imaging data are a depth image, and the method further comprises:
after performing the liveness detection on the imaging object,
responsive to that the liveness detection succeeds, matching a structured light depth model formed with the depth image with a preset face depth model; and
responsive to that the structured light depth model matches the preset face depth model, determining that identity verification succeeds,
wherein performing the liveness detection on the imaging object based on the second imaging data comprises:
identifying a target organ from the structured light depth model;
continuously acquiring a depth image, and tracking the target organ to identify whether the target organ is in a moving state; and
responsive to that the target organ is in the moving state, determining that the imaging object is a living body.

3. A mobile terminal, comprising an image sensor, a memory, a Microcontroller Unit (MCU), a processor, and a trusted application stored on the memory and capable of being run in a trusted execution environment of the processor, wherein
the MCU is special hardware of the trusted execution environment, is connected with the image sensor and the processor;
wherein the MCU is configured to:
control an infrared sensor to start for imaging;
acquire first imaging data obtained by the infrared sensor through the imaging; and
send the first imaging data to the processor, the processor is configured to:
compare an imaging object with a pre-stored imaging object based on the first imaging data; and
responsive to that the imaging object is the pre-stored imaging object, trigger the MCU;
the MCU is further configured to: control an image sensor to perform imaging, an imaging data obtained by the image sensor through the imaging being second imaging data; and send the second imaging data to the processor; and
the processor is configured to perform the liveness detection on the imaging object based on the second imaging data;
wherein the image sensor is a visible light sensor and the second imaging data comprises a visible light image, and the processor is configured to:
identify a target organ in a face area from the visible light image;
continuously acquire a visible light image, and track the target organ to identify whether the target organ is in a moving state; and
responsive to that the target organ is in the moving state, determine that the imaging object is a living body, or
the first imaging data is an infrared image, and the processor is configured to:
identify a face area in the visible light image, and determine, in the infrared image, a first target area corresponding to the face area;
determine a second target area based on the first target area, the second target area comprising the first target area and being greater than the first target area;
make a statistics of histograms in the second target area and calculate a contrast based on the histograms; and
responsive to that the contrast is greater than a threshold, determine that an imaging object of the infrared image and the visible light image is a living body;
wherein the processor is configured to:
responsive to that the liveness detection succeeds, control a structured light sensor to start for imaging;
acquire third imaging data obtained by the structured light sensor through the imaging; and
send the third imaging data to the processor,
the processor is configured to:
match a structured light depth model in the third imaging data with a preset face depth model; and
responsive to that the structured light depth model matches the preset face depth model, determine that identity verification succeeds.

4. The mobile terminal of claim 3, wherein the image sensor is a structured light sensor and the second imaging data are a depth image, and the processor is configured to:
responsive to that the liveness detection succeeds, match a structured light depth model formed with the depth image with a preset face depth model; and
responsive to that the structured light depth model matches the preset face depth model, determine that identity verification succeeds.

5. The mobile terminal of claim 4, wherein the processor is configured to:
identify a target organ from the structured light depth model;
continuously acquire a depth image, and track the target organ to identify whether the target organ is in a moving state; and
responsive to that the target organ is in the moving state, determine that the imaging object is a living body.

6. The mobile terminal of claim 3, wherein the first imaging data is an infrared image and the processor is configured to:
extract an imaging outline from the infrared image;
match the imaging outline with an imaging outline of the pre-stored imaging object; and
responsive to that the imaging outline matches the imaging outline of the pre-stored imaging object, determine that the imaging object pertains to an owner.

\* \* \* \* \*